US008173240B2

(12) United States Patent
Döhring

(10) Patent No.: US 8,173,240 B2
(45) Date of Patent: May 8, 2012

(54) DECORATIVE PAPER WITH SPRINKLED CORUNDUM, COATED WITH AN ADHESIVE

(75) Inventor: Dieter Döhring, Lampertswalde (DE)

(73) Assignee: Kronoplus Technical AG, Niederteufen (CH)

( * ) Notice: Subject to any disclaimer, the term of this patent is extended or adjusted under 35 U.S.C. 154(b) by 307 days.

(21) Appl. No.: 10/595,215

(22) PCT Filed: Oct. 11, 2003

(86) PCT No.: PCT/EP03/11285
§ 371 (c)(1),
(2), (4) Date: Mar. 24, 2006

(87) PCT Pub. No.: WO2005/042644
PCT Pub. Date: May 12, 2005

(65) Prior Publication Data
US 2006/0275575 A1 Dec. 7, 2006

(30) Foreign Application Priority Data
Sep. 30, 2003 (DE) .................................. 203 15 135

(51) Int. Cl.
B32B 3/00 (2006.01)
B32B 29/00 (2006.01)
B32B 1/00 (2006.01)
(52) U.S. Cl. ........... 428/80; 428/143; 428/215; 428/220
(58) Field of Classification Search .................. 428/80, 428/143, 220, 215
See application file for complete search history.

(56) References Cited

U.S. PATENT DOCUMENTS

| 4,473,613 | A | * | 9/1984 | Jaisle et al. | 428/220 |
| 4,940,503 | A | | 7/1990 | Lindgren et al. | |
| 5,545,476 | A | * | 8/1996 | O'Dell et al. | 428/327 |
| 5,672,097 | A | | 9/1997 | Hoopman | |
| 5,804,618 | A | * | 9/1998 | Mafoti et al. | 524/53 |
| 6,290,815 | B1 | | 9/2001 | Caulet et al. | |
| 6,401,401 | B1 | | 6/2002 | Williams | 52/58 |
| 6,715,237 | B2 | | 4/2004 | Batt, Sr. | 52/11 |
| 6,835,421 | B1 | * | 12/2004 | Dohring | 427/411 |
| 6,994,834 | B1 | * | 2/2006 | Shirono et al. | 423/335 |
| 7,114,301 | B2 | | 10/2006 | Bibaud et al. | 52/219 |
| 2003/0138600 | A1 | * | 7/2003 | Dohring et al. | 428/143 |

FOREIGN PATENT DOCUMENTS

| CN | 1094840 | 11/1999 |
| CN | 1358247 | 7/2002 |
| EP | 0255079 | 2/1988 |

(Continued)

OTHER PUBLICATIONS

"Research of the Modification Function of Silane Coupling Agent to Alumina-Epoxy Casting System", Journal of Insulation Material, vol. 4, pp. 15-17, section 1.1 on p. 15, 1999, in Chinese.

Primary Examiner — Brent Ohern
(74) Attorney, Agent, or Firm — Renner, Otto, Boisselle & Sklar, LLP

(57) ABSTRACT

A paper for a laminate panel includes a first layer that includes a resin impregnated decorative paper or a resin impregnated overlay; and a second layer of abrasion resistant particles uniformly distributed on and adhered to the first layer.

13 Claims, 1 Drawing Sheet

FOREIGN PATENT DOCUMENTS

| | | |
|---|---|---|
| EP | 0 519 242 A1 | 12/1992 |
| EP | 0722992 | 7/1996 |
| EP | 0953591 | 11/1999 |
| EP | 1262455 | 12/2002 |
| RU | 2 124 978 | 1/1999 |
| WO | 00/44576 | 8/2000 |
| WO | WO 00/44984 * | 8/2000 |
| WO | 02/079571 | 10/2002 |

* cited by examiner

DECORATIVE PAPER WITH SPRINKLED CORUNDUM, COATED WITH AN ADHESIVE

This application is a national phase of International Application No. PCT/EP2003/011285 filed Oct. 11, 2003 and published in the English language.

FIELD OF INVENTION

The invention relates to abrasion-resistant particles needed for a method for the production of decorative paper with an abrasion-resistant surface. The invention further relates to a decorative paper produced therefrom.

BACKGROUND

U.S. Pat. No. 4,940,503 discloses a method wherein abrasion-resistant particles are optionally sprinkled onto an overlay impregnated with a melamine resin or a decorative paper impregnated with melamine resin. Overlay and decorative paper are subsequently pressed together such that a decorative paper with an abrasion-resistant surface results. However, the abrasion resistance that can be accomplished by means of such a method is relatively small compared with other methods.

WO 00/44576 A1 discloses another method wherein abrasion-resistant particles are sprinkled onto the impregnated decorative paper like corundum. Then, fibers are applied together with resin and the system of layers is pressed. The abrasion resistance is also small in this method.

WO 00/44984 A1 discloses a method wherein a special dispersion containing abrasion-resistant particles such as corundum or silicon carbide is sprayed onto a decorative paper. The decorative paper in turn is used in the production of a laminated flooring panel. Though high abrasion values can be attained by means of this method, a great instrumentation expenditure must disadvantageously be made because excess dispersion has to be handled, apparatuses for the directed spraying are necessary, a continuous mixing of the dispersion must be ensured and finally, a great effort for drying must be made.

SUMMARY

It is the object of the invention to create a decorative paper having a high abrasion resistance which can be produced in a simple manner.

According to the invention, abrasion-resistant particles are coated with an adhesion promoter and the abrasion-resistant particles are sprinkled onto an impregnated decorative paper or onto an impregnated overlay. Then, decorative paper and overlay are pressed together. When the abrasion-resistant particles have been sprinkled onto the decorative paper, fibers, for example, may be sprinkled on and a resin may be applied instead of an overlay, in order to protect a press from damage by the abrasion-resistant particles during pressing.

By the use of the sprinkling method, a more uniform distribution of the abrasion-resistant material can be achieved compared with the spraying method as known from WO 00/44984 A1. In addition, the instrumentation expenditure is less. The coating of the particles with a adhesion promoter can be achieved very easily because the particles must only be temporarily submerged in a corresponding both. This takes much less technical effort in comparison to the instrumentation expenditure necessary according to WO 00/44984 A1.

In order to be able to dose the particles particularly safely, the particles provided with the adhesion promoter are preferably dried before sprinkling. In the dried and thus especially well-meterable state the adhesion promoter coats the abrasion-resistant particles in particular completely in order to thus attain particularly good abrasion values. To this end, the abrasion-resistant particles are first submerged in a liquid that substantially consists of the adhesion promoter. Alternatively, the abrasion-resistant particles are sprayed with the adhesion promoter. This still takes less effort in comparison to the effort that must be made according to WO 00/44984 A1, because no attention must be paid to metering and circulation. Then, the particles are dried and are now particularly well useable. The dried abrasion-resistant particles provided with an adhesion promoter are sprinkled onto the decorative paper or the overlay. Preferably, a roller provided with cavities which, in particular, run irregularly, is used for sprinkling. However, the depth of the cavities is substantially maintained. The abrasion-resistant particles provided with the adhesion promoter are sprinkled onto the roller from above and thus arrive in the cavities. Excess material, i.e. excess abrasion-resistant particles provided with a adhesion promoter, are taken off by means of a doctor blade. Then, the rotating roller comes to a brush which brushes out the abrasion-resistant particles provided with a adhesion promoter.

The brush concerned is preferably a circulating roller provided with bristles in order to thus brush out uniformly the abrasion-resistant particles provided with a adhesion promoter. In this manner, the abrasion-resistant particles are uniformly sprinkled onto the decorative paper or the overlay paper, namely preferably in an amount of 18 to 25 g/m², dependent upon the desired abrasion class. The grain size preferably has a diameter of 90 to 130 μm. If the diameter is selected to be smaller, a relatively large amount of abrasion-resistant particles and adhesion promoter is used up. If the diameter is selected to be larger, the abrasion-resistant particles may penetrate the overlay usually employed and damage the press.

Before the paper, i.e. the decorative paper or the overlay, is sprinkled with the abrasion-resistant particles, the respective webs are guided through a melamine resin or a mixture containing melamine resin. The adhesion promoter enables the integration of the corundum particles and/or the silicon carbide into the resin matrix. Otherwise, an optically visible boundary surface between the abrasion-resistant particles and the resin and/or the resin matrix remains which leads to graying. If no adhesion promoter is used, the abrasion-resistant particles can be torn out of the matrix, leading to small abrasion values.

Particularly preferably, the abrasion-resistant material is sprinkled onto the decorative paper, since practical experience has shown that the abrasion-resistant particles are more prone to damage the press when the abrasion-resistant particles are immediately sprinkled onto the overlay.

Finally, the overlay and the decorative paper are brought together and pressed together in such a way that the abrasion-resistant particles form an intermediate layer. The surface temperature during the pressing preferably is 180° C. to 185° C. Typically, pressures of 20 to 35 bar are used. The specified temperature is advantageous for the resin material to harden. The specified pressure is advantageous in order to keep the water contained in the system of layers in liquid form. Otherwise, it would escape in gaseous form and thereby create a rough surface. Due to the high pressure, a very homogeneous surface is ensured.

Particularly preferably, the decorative paper has a mass of 20 to 60 g/m² in order to be able to manage with small amounts of resin. The decorative paper is filled with acrylate or an acrylate-containing dispersion in order to be able to further reduce the amount of relatively expensive melamine resin needed. The acrylate and/or the dispersion is pressed into the decorative paper in particular from both sides in order to thus ensure that it arrives in the interior of the paper. WO 02/079571 A1 discloses suitable compositions as well as a method for bringing the acrylate and/or the dispersion into the interior of the paper within the sense of the present invention.

During sprinkling, funnels are preferably provided on the sides of the papers (overlay or decorative paper) via which excess abrasion-resistant particles are collected and carried away. In this manner the abrasion-resistant particles can be reused if they were sprinkled on in excess on the sides.

Compared to the spraying technique known from WO 00/44984 A1, a great instrumentation expenditure is avoided. In combination with corundum as the abrasion-resistant material, the provision of brilliant surfaces while using dark decorative papers is successful for the first time.

Corundum or aluminum oxide particles are preferably provided as abrasion-resistant particles because alternative materials such as silicon carbide can be incorporated in a resin matrix in a simpler manner. Silicon carbide, however, has the disadvantage compared to corundum or aluminum oxide that they are dark particles which are quite visible in particular on light decors. As a rule, silicon carbide is therefore less suitable for reasons of appearance.

When impregnating, the decorative paper is typically provided with 100 to 120% by wt resin in relation to the decorative paper. Therefore, if the weight per unit area of the decorative paper is, for example, 100 g/m$^2$, then 100 to 120 g resin are used. If, however, decorative paper with a weight of only 30 g/m$^2$ is provided and if an acrylate and/or and acrylate-containing dispersion was pressed into the paper, then the amount of resin required for impregnation can be reduced to 45 to 55% by wt.

Instead of melamine resin, mixed resins may also be used. Typically, such a mixed resin could consist of 70 to 80% by wt urea resin and 20 to 30% by wt melamine resin in order to lower the costs for the resin in this manner. Decorative paper is preferably impregnated with a mixed resin because costs can be saved in this way. An overlay is preferably impregnated with pure melamine resin in order to thus provide the desired surface properties. Insensitivity against stain formation as well as resistance to chemicals is what matters particularly with regard to the surface. Melamine resin also protects the surface particularly well against moisture.

The result is a decorative paper in which corundum lies in one plane. This is because corundum has been sprinkled onto the paper. This can be determined by means of the microscope. Furthermore, the adhesion promoter that coats the abrasion-resistant particles can be found in the finished product.

As adhesion promoters, ones that are based on silane are preferred because those adhesion promoters are particularly well suited to adhere on the one hand to the corundum or aluminum oxide and on the other hand to interact with the resins used in the desired manner in order to bring about the desired adhesion and thus the desired abrasion resistance.

Basically, other adhesion promoters are also suitable. An amino-silane adhesion promoter has, however, been found to be particularly suitable.

DETAILED DESCRIPTION

Figure 1:
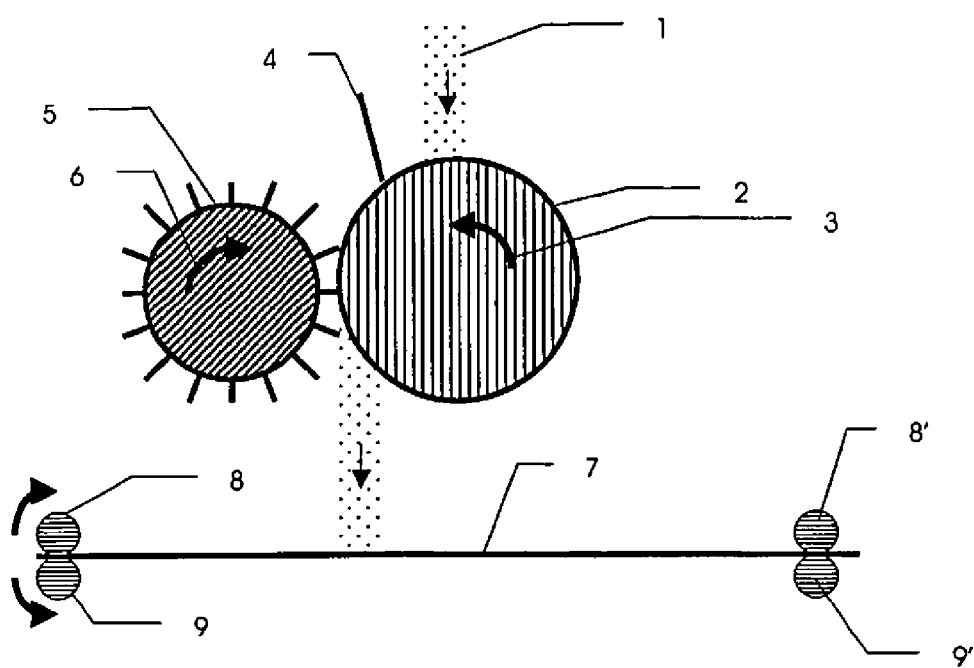
FIG. 1 shows a device for sprinkling abrasion-resistant particles onto a paper.

Abrasion-resistant particles 1 of corundum having a diameter of 90 to 130 μm were coated with a silane adhesion promoter and dried. The abrasion-resistant particles 1 are now in a free-flowing state and are sprinkled onto a roller 2, as the FIG. 1 illustrates in cross section. The roller 2 has cavities on the surface that are not shown. By the slow turning of the roller 2 counter-clockwise and along the arrow 3, the sprinkled particles come to a doctor blade 4 which contacts the roller 2 with an open end. It is ensured by means of the doctor blade 4 that the abrasion-resistant particles 1 fill the cavities uniformly and completely. From here, the abrasion-resistant particles are transported further to a rapidly rotating brush 5 which in this example rotates clockwise in the direction of the arrow 6. The abrasion-resistant particles are thus completely brushed out of the cavities and in this way arrive on the surface of a decorative paper 7. The decorative paper is guided underneath the roller by means of suitably rotating rollers 8 and 9. Immediately before, the decorative paper 7 was impregnated with a mixture of 25% by wt melamine resin and 74% by wt urea resin. The decorative paper has a weight per unit area of 30 g/m$^2$ and has acrylate in its interior. The application of resin during impregnation is 15 g per square meter paper.

In this way, a particularly uniform sprinkling of the paper with abrasion-resistant particles is achieved. The abrasion-resistant particles 1 here adjoin the side with the printed décor.

Figure 2:
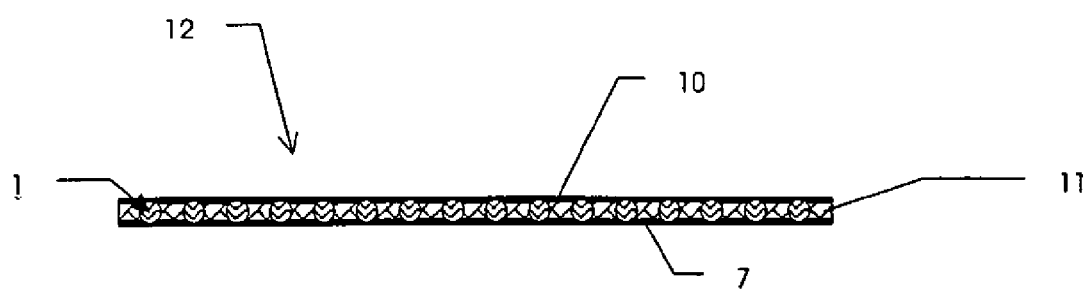
FIG. 2 shows produced paper.
Figure 3:
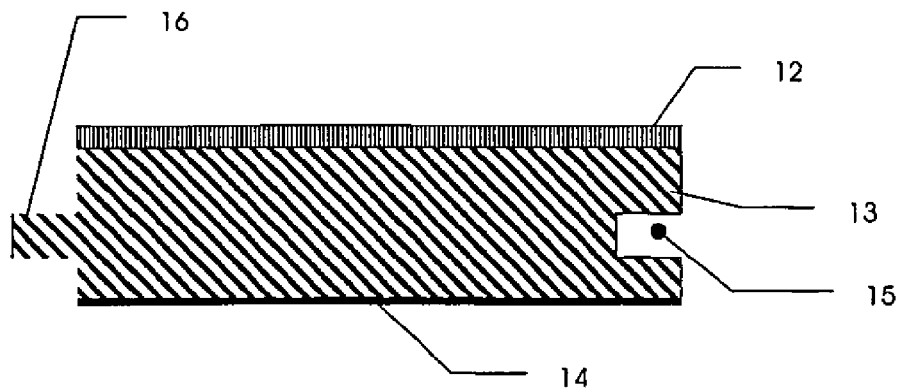
FIG. 3 shows a panel with produced paper.

Then, an overlay 10 that has been impregnated with melamine resin is laid over the abrasion-resistant particles 1 and the system of layers is then pressed while supplying heat at pressures of 30 bar and temperatures of 180° C. The result is the construction that is schematically shown in FIG. 2 in which the abrasion-resistant particles are now firmly anchored in the resin matrix 11. The abrasion-resistant particles 1 are located in one plane.

The decorative paper 12 thus provided with an abrasion-resistant layer is now pressed together with a base board 13 of HDF and a backing paper 14. Then, panels of the desired size of typically 20 to 40 cm width and a length of typically 80 cm to 160 cm are sawed out and laterally provided with coupling means such as groove 15 and tongue 16. Preferably, groove and tongue have further coupling means that are not shown and which are able to interconnect the two panels in a positive fit such that there is an Interlock parallel relative to the surface of the panels. Such interlocks are known, for example, from WO 02/079571 A1.

The backing paper in particular has a low weight by unit area of 20 to 60 g/m$^2$ and preferably is provided with acrylate and has been impregnated, prior to pressing, with a urea resin or a mixture that predominantly contains urea resin. In this manner, the costs for the application of the backing paper are minimized since comparatively little resin is used which, compared to other resins, is relatively inexpensive. The backing paper protects a panel from warping.

The invention claimed is:

1. A paper for a laminate panel comprising:
    a first layer comprising a resin impregnated decorative paper or a resin impregnated overlay, the resin comprising a melamine resin or an urea resin or a mixture of both; and
    a second layer of abrasion resistant particles uniformly distributed on and adhered to the first layer, wherein the abrasion resistant particles have an outer coating consisting of an amino-silane adhesion promoter, the outer coating formed by coating the abrasion resistant particles with a liquid consisting of the amino-silane adhesion promoter, and then drying the coated abrasion resistant particles to form the outer coating on the abrasion resistant particles, wherein the abrasion resistant particles with the outer coating thereon are applied to the first layer after drying the coated abrasion resistant particles.

2. The paper according to claim 1, wherein the abrasion-resistant particles have a diameter of 50 to 200 μm.

3. The paper according to claim 1, wherein the abrasion-resistant particles are made of silicon carbide or aluminum oxide.

4. The paper according to claim 1, wherein the decorative paper has a weight of 20 to 60 g/m².

5. The paper according to claim 4, wherein the decorative paper is filled with an acrylate.

6. The paper according to claim 1, wherein the abrasion resistant particles lie in a plane.

7. The paper according to claim 1, wherein the resin contains an amino resin and a further resin, and the paper is provided with a decor.

8. The paper according to claim 2, wherein the abrasion-resistant particles have a diameter of 90 to 130 μm.

9. The paper according to claim 7, wherein the first layer comprises a decorative paper and the paper further comprises a third layer overlying the second layer comprising an overlay or fibers, and the overlay or the fibers are impregnated with a pure amino resin.

10. The paper according to claim 1 wherein the abrasion resistant particles comprise corundum.

11. A laminate panel comprising the paper according to claim 1, applied on a baseboard made of a derived timber product.

12. The laminate panel according to claim 11, comprising coupling elements disposed along opposite longitudinally extending edges and opposite transversely extending edges, so that the laminate panel can be connected to another like laminate panel both in a transverse and longitudinal direction relative to the surface of the panel.

13. The laminate panel according to claim 11, comprising a backing paper provided with a urea resin.

* * * * *